UNITED STATES PATENT OFFICE.

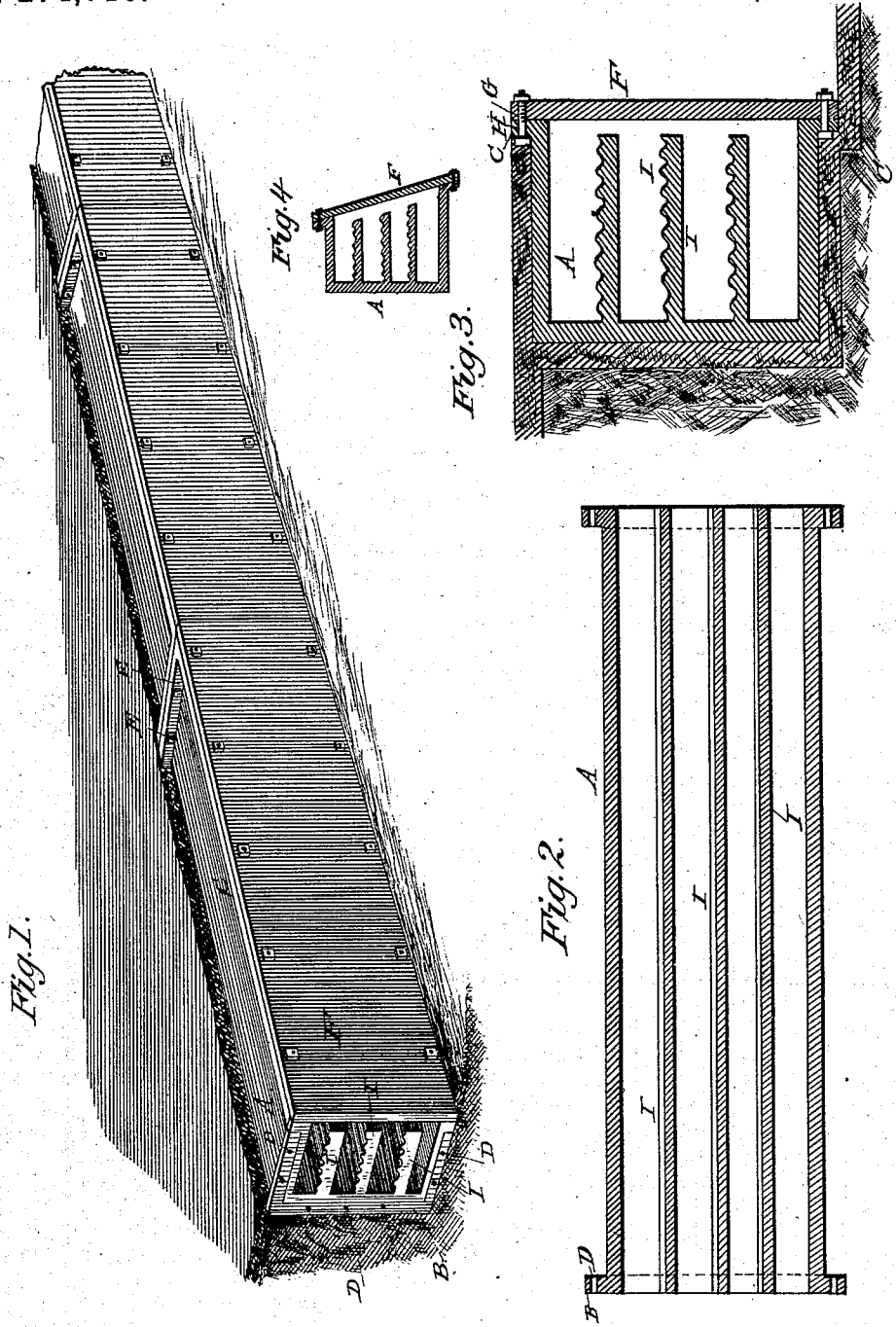

SIMON BRENTANO, OF NEW YORK, N. Y.

CONDUIT FOR TELEGRAPH OR TELEPHONE LINES.

SPECIFICATION forming part of Letters Patent No. 274,710, dated March 27, 1883.

Application filed December 23, 1882. (No model.)

*To all whom it may concern:*

Be it known that I, SIMON BRENTANO, of New York, in the county of New York and State of New York, have invented certain new and useful Improvements in Conduits for Telegraph or Telephone Lines; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved conduit for telegraph or telephone lines. Fig. 2 is a longitudinal vertical section. Fig. 3 is a cross-section of the same, and Fig. 4 is a similar view of a modification of the same.

Similar letters of reference indicate corresponding parts in all the figures.

My invention has relation to conduits for telegraph, telephone, or electric-light wires; and it consists in the improved construction, as hereinafter more fully described and claimed, of a conduit to be placed in the edge of a sidewalk, taking the place of the curbstones.

In the accompanying drawings, the letter A indicates a rectangular trough, which may be made of metal, vitreous material, artificial stone, or any other suitable material, and the ends and edges of which are provided with flanges B and C. The end flanges, B, serve to connect the ends of the troughs together, the flanges having holes D, through which bolts E may be inserted and secured by nuts or otherwise.

F is the lid, which has bolt-holes G in its edges, corresponding to bolt-holes H in the side flanges, C, through which bolts may be inserted, securing the lid to the trough.

The conduit is placed, as shown in Figs. 1 and 3, the lid facing the street, and asphalt or other material filled around the trough in the recesses formed by the flanges.

Where the conduit is carried across a street the trough may be placed with the lids upward, in the same manner as the flag-stones used for street-crossings, and the lids may then be notched or corrugated to prevent persons or horses from slipping upon them. The wires are disposed upon longitudinally-grooved shelves I, extending from the inner wall of the conduit in such a manner that by opening the lid on the side of the conduit, each separate wire may be handled or removed without disturbing the other wires, there being a space large enough to admit a man's hand between the shelves.

By constructing a conduit in this manner free access may always be had to the wires without the necessity of breaking the pavement up, and laying the conduit itself only necessitates the taking up of the curbstones and placing the troughs in their place.

Having thus described my invention, I claim and desire to secure by Letters Patent of the United States—

A conduit for electric wires, consisting of a trough adapted to form the curb of a street, having a removable lid or cover on the side facing the roadway, and provided with a series of horizontal longitudinally-grooved shelves or wire-supports fixed upon the inside wall of the trough and extending outwardly toward the removable side lid or cover, with sufficient space between the shelves to admit of handling of the wires separately, substantially as and for the purpose shown and set forth.

In testimony that I claim the foregoing as my own I have hereunto affixed my signature in presence of two witnesses.

SIMON BRENTANO.

Witnesses:
JNO. A. MADIGAN,
AUGUST PETERSON.